United States Patent [19]
Nishimura

[11] Patent Number: 5,768,444
[45] Date of Patent: Jun. 16, 1998

[54] FILM IMAGE INPUT METHOD

[75] Inventor: Toru Nishimura, Asaka, Japan

[73] Assignee: Fuji Photo Film Co., Ltd., Kanagawa, Japan

[21] Appl. No.: 698,311

[22] Filed: Aug. 15, 1996

[30] Foreign Application Priority Data

Aug. 16, 1995 [JP] Japan ................................. 7-208839

[51] Int. Cl.[6] .............................. H04N 1/27; H04N 1/387
[52] U.S. Cl. .......................... 382/298; 358/506; 358/527; 358/451
[58] Field of Search ..................... 358/504–506, 358/527, 406, 451–453, 487; 348/96–100; 355/122, 123, 127; 382/199, 276, 291, 298; H04N 1/27, 1/387

[56] References Cited

U.S. PATENT DOCUMENTS 5,414,779  5/1995  Mitch ............................ 358/506
5,633,733  5/1997  Miyazawa ..................... 358/527

FOREIGN PATENT DOCUMENTS 5-327194  12/1993  Japan .
WO 9 004301  4/1990  WIPO .

Primary Examiner—Kim Vu

[57] ABSTRACT

A roll of developed still photographic film feeds toward an image capturing part. The image capturing part captures the image data of plural frames. An index image, which is composed of plural frames, is made in accordance with the captured image data of plural frames, and the index image is displayed on a display. When the index image is displayed, the format information relating to an aspect ratio of each frame, which is recorded in the film, is read. An image processing conforming to the format information of each frame is executed in accordance with the read format information, so that the aspect ratio of each frame in the index image can be seen. Only an image area, which is required for display and printing, is read according to the format information relating to the aspect ratio of each frame. As a result, the pixels of the line sensor can be used effectively.

20 Claims, 13 Drawing Sheets

FILM IMAGE INPUT METHOD

BACKGROUND OF THE INVENTION

1. Field of the Invention

The present invention relates to a film image input method, and more particularly to a film image input method which includes the steps of feeding a roll of developed photographic film to an image capturing part, capturing the image data representing the film image by the image capturing part, and displaying the film image on a monitor TV or printing it by a printer according to the captured image data.

2. Description of the Related Art

The conventional film scanner is disclosed in WO90/04301, etc. . In the film scanner, an image sensor such as a CCD picks up the developed still photographic film. The image on the photographic film is converted into an image signal, which is transmitted to a monitor TV so that the film image can be displayed.

In a recently-proposed advanced photo system camera, a subject image is taken into a predetermined exposure area on the film regardless of an aspect ratio (such as high-vision size, panoramic size, and normal photographic size) selected during the photographing. The format information relating to the aspect ratio is recorded optically or magnetically on the film in accordance with each frame.

There is also disclosed a film image input method (Japanese Patent Application No. 5-327194) which comprises the steps of feeding a roll of developed still photographic film to an image capturing part which includes a line sensor, capturing image data of all frames, and making an index image composed of plural frames according to the captured image data to display the index image on a monitor TV.

However, the subject image is taken into a predetermined exposure area on the film photographed by the advanced photo system camera regardless of the aspect ratio selected during the photographing. Therefore, if the index image is produced from the film and is displayed on the monitor TV, there is a problem in that the aspect ratio of each frame cannot be seen on the index image. An area captured by the conventional line sensor is fixed regardless of the aspect ratio of the film image which is displayed on the monitor or is printed. Therefore, for instance, even if an image is the panoramic size, the entire image including the image taken into the upper and lower parts of the film is scanned. As a result, the resolution of the line sensor is wasted.

SUMMARY OF THE INVENTION

The present invention has been developed under the above-described circumstances, and has its object the provision of a film image input method which can display an aspect ratio of each frame so that the aspect ratio can be seen when an index image is displayed even if an exposure area on the film is fixed regardless of the aspect ratio. Further, it captures only the necessary image area according to the aspect ratio of the scanned film image so as not to waste the resolution of the film scanner, so that the resolution can be prevented from being lowered when the image is displayed on the monitor or is printed.

In order to achieve the above-described objects, a film image input method, which comprises feeding a roll of developed photographic film, in which a subject image is taken into a predetermined exposure area regardless of an aspect ratio of a film image, and format information as to the aspect ratio is recorded optically and/or magnetically on the film in accordance with each frame, to an image capturing part so as to capture image data of plural frames by the image capturing part, making an index image composed of plural frames in accordance with captured image data of plural frames, and displaying the index image on a display comprises the steps of: optically and/or magnetically reading the format information recorded on the film; executing an image processing according to the format information of each frame when the index image is displayed; and making it possible for the aspect ratio of each frame in the index image to be seen. That is, each frame in the index image is displayed in an aspect ratio, which is set during the photographing of the frame or is changed to meet the user's preference after that. Therefore, the user can confirm the aspect ratio of each frame in the index image with his or her own eyes. Incidentally, if the format information is changed, the changed format information is magnetically recorded on the film of the frame.

Furthermore, a film image input method, which comprises feeding a roll of developed photographic film, in which film image and format information as to an aspect ratio of the film image are optically and/or magnetically recorded on the film in accordance with each frame, to an image capturing part including a line sensor so as to capture the film image by the image capturing part, comprises the steps of: reading the format information as to the aspect ratio of each frame optically and/or magnetically; and capturing an area of validity in accordance with the format information of the film image by electronically or optically zooming the area of validity according to the format information so that the number of pixels in a main-scanning direction of the area of validity is predetermined.

For example, in the case of the panoramic size, the length in the main-scanning direction of the area of validity is shorter than those of the high-vision size and the normal photographic size. The electronic zooming such as decreasing and interpolating the image data is performed so that the number of pixels in the main-scanning direction of the area of validity can be fixed. Furthermore, the magnification of the taking lens is changed instead of the electronic zooming so that the number of pixels in the main-scanning direction of the area of validity is fixed in the panoramic size, the high-vision size, and the normal photographic size.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
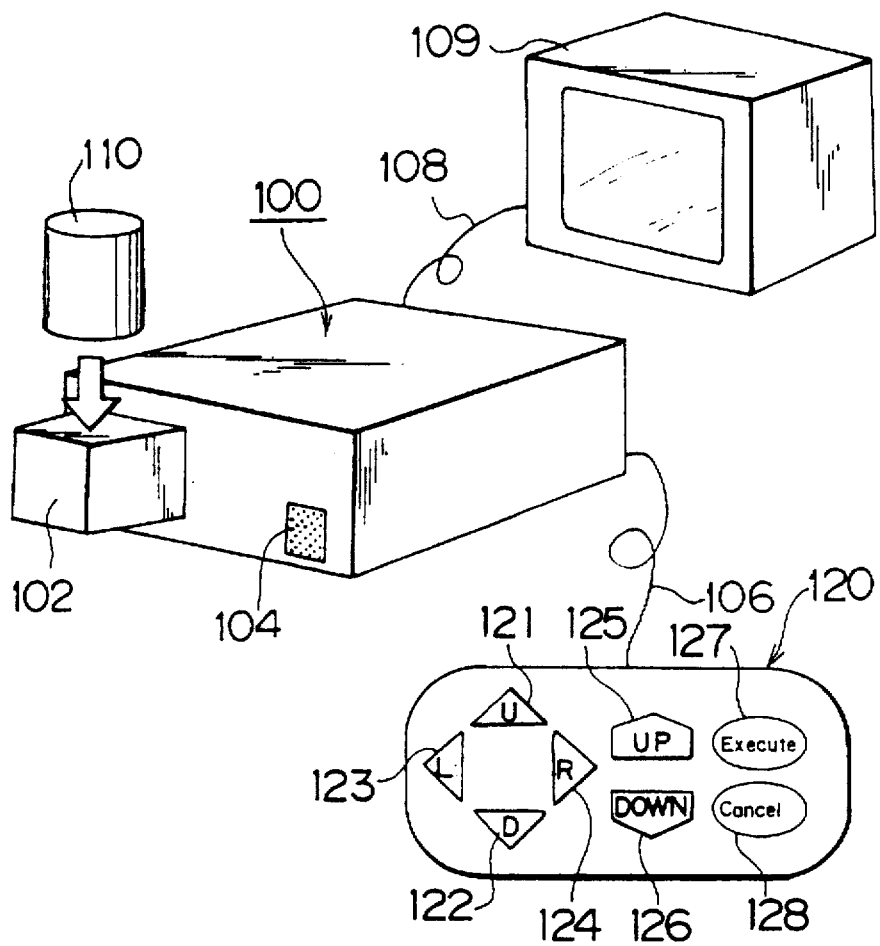
FIG. 1 is a perspective view roughly illustrating the structure of a system including a film scanner to which a film image input method according to the present invention is applied.

FIG. 1 is a perspective view illustrating an overall structure of the whole system including a film scanner to which a film image input method according to the present invention is applied. As shown in FIG. 1, the film scanner 100 is a rectangular-parallelepiped, and a film cartridge tray 102 and a power switch 104 are provided at the front of the film scanner 100. The film cartridge tray 102 is driven backward and forward when a film cartridge 110 is loaded or unloaded. As a result, the film cartridge 110 is loaded or unloaded.

A key pad 120 and a monitor TV 109 are connected to the film scanner 100. The key pad 120 transmits various operational signals, which control the film scanner 100, to the film scanner 100 via a signal cable 106. The film scanner 100 transmits a video signal to the monitor TV 109 via a signal cable 108. Incidentally, a detailed explanation will be given later about the control of the film scanner 100 by means of the key pad 120.

Figure 2:
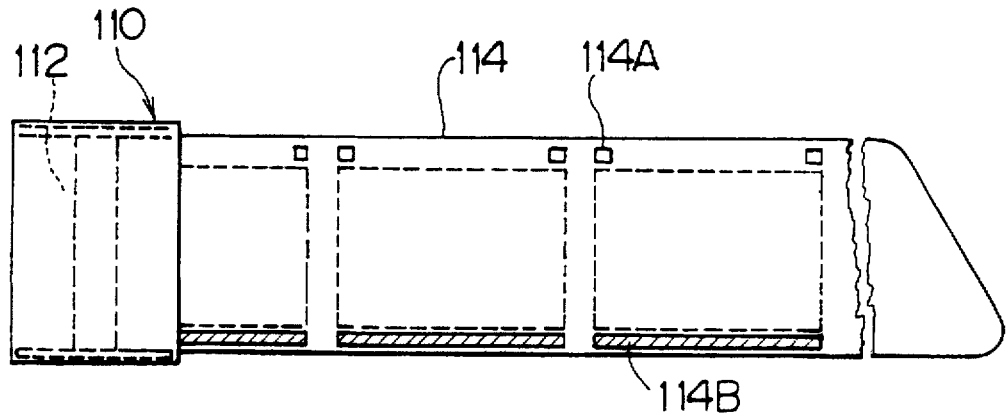
FIG. 2 is a view illustrating one example of a film cartridge which is applied to a film scanner in FIG. 1.

As shown in FIG. 2, the film cartridge 110 has a single spool 112, and a photographic film 114 is wound on the spool 112. A perforation 114A is formed in the photographic film 114 to indicate a position of each frame. A magnetic record layer 114B is formed on the whole surface or the edge of the film. The magnetic record layer 114B can record the magnetic data indicating the photographic data for each frame, and the like by the camera provided with a magnetic head. The developed photographic film 114 is wound up by the film cartridge 110, so that it can be kept.

The camera, which uses the film cartridge 110, is able to record the various magnetic data of each frame in the magnetic record layer 114B of the film 114 by the magnetic head which is built in the camera. For example, the magnetic data relates to a frame number, a print format indicating an aspect ratio of the film image (high-vision size of 9:16, panoramic size of 1:3, normal photographic size of 2:3), the photographing date, the direction of a taken image, a subject distance, the position of a main subject in one screen, and so forth. Other various data can be recorded by the camera. A bar code, which indicates a film type, a frame number, etc., and the data, which indicates the print format, etc. by a light source built in the camera during the photographing, can be optically recorded in an area in the film outside a predetermined exposure area, which is exposed by the subject light.

Figure 3A:
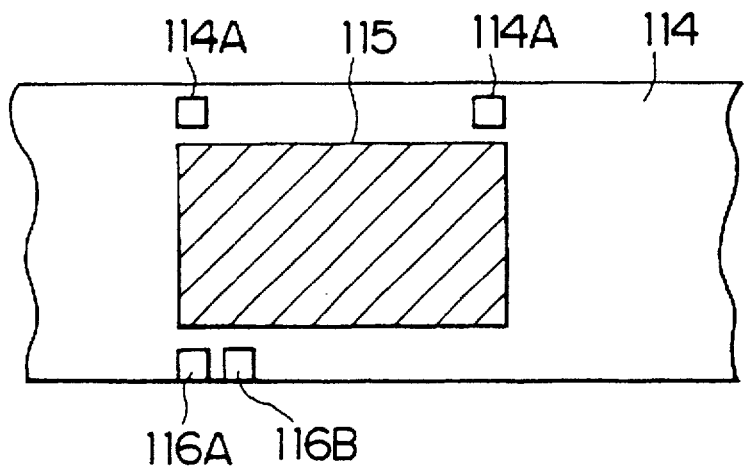
FIGS. 3 (A), 3 (B), and 3 (C) are views illustrating one example of a film on which the format data representing a print format is optically recorded by a light source built in a camera during the photographing.
Figure 3B:
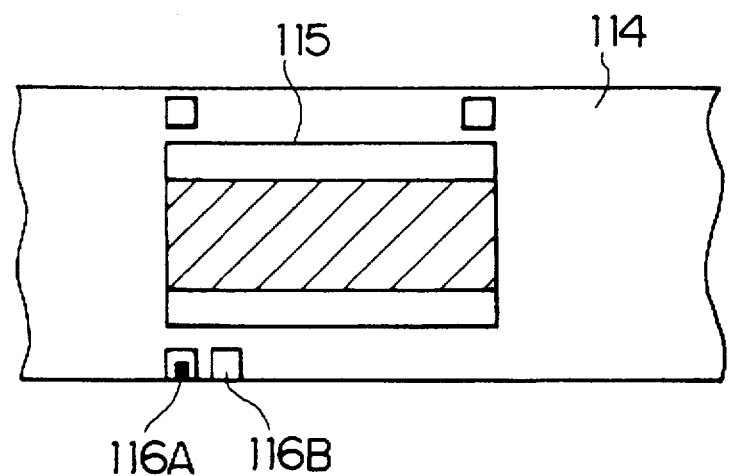
Figure 3C:
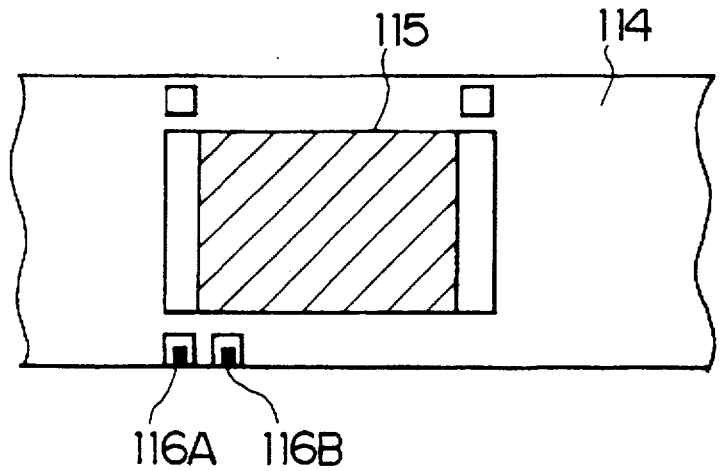

FIG. 3 is a view showing an example of the film, which records optically therein the format data which indicates the print format by the light source built in the camera during the photographing. In FIG. 3, 115 is a predetermined exposure area which is exposed by the subject light, and 116A and 116B are 2-bit record areas in which the format data is recorded optically. An area, which is indicated by slashes, is an area of the film image, which is monitor-displayed, or printed.

As shown in FIG. 3, the exposure area 115 is an area exposed by the subject light regardless of the aspect ratio which is set during the photographing. The format data relating to the aspect ratio, which is set during the photographing, is optically recorded in the record areas 116A and 116B as shown in FIGS. 3 (A), 3(B), 3 (C), and the following table.

TABLE 1

|  | 116A | 116B | Aspect Ratio |
| --- | --- | --- | --- |
| FIG. 3 (A) | unexposed | unexposed | High-vision |
| FIG. 3 (B) | exposed | unexposed | Panorama |
| FIG. 3 (C) | exposed | exposed | Normal |

As shown in the table above, the optical data, which indicates the high-vision size (size H), the panoramic size (size P) and the normal photographic size (size L), is recorded according to whether the 2-bit record areas 116A and 116B are exposed or not. As shown in FIG. 3 (A), the exposure area 115 has the aspect ratio of size H.

Accordingly, the film scanner 100 is able to recognize the aspect ratio of the frame image by optically reading the format data recorded in the record areas 116A and 116B. For example, if the aspect ratio is the size P, the image data in which the upper and lower areas of the exposure area 115 are masked, can be sent to the monitor TV or the printer. If the aspect ratio is the size L, the image data, in which the right and left areas of the exposure area 115 are masked, can be sent to the monitor TV or the printer.

Figure 4:
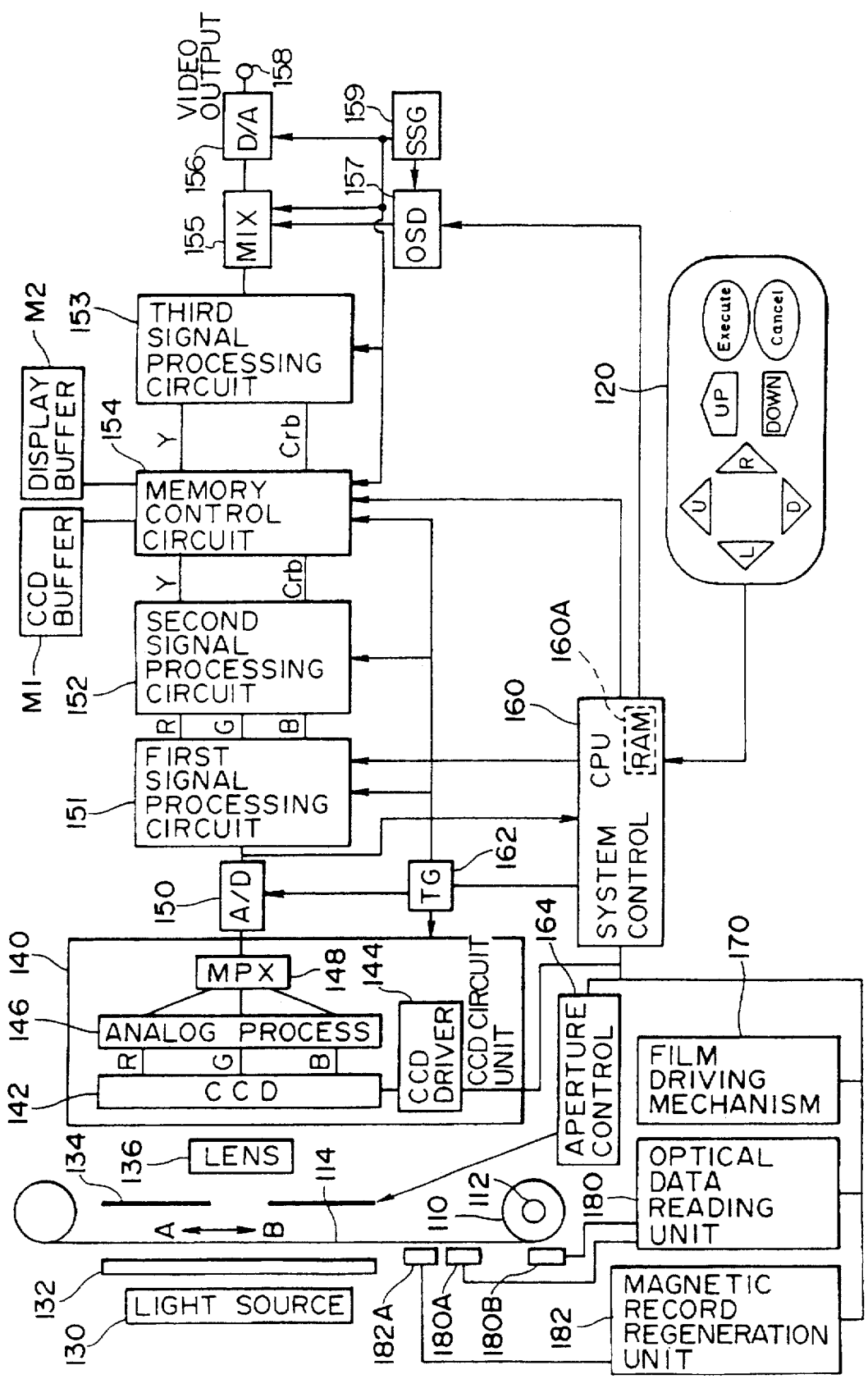
FIG. 4 is a block diagram illustrating one embodiment of the inner structure of the film scanner in FIG. 1.

FIG. 4 is a block diagram illustrating an example of the inner structure of the film scanner 100. The film scanner 100 mainly comprises a light source 130, a taking lens 136, and a CCD circuit unit 140 including a CCD line sensor 142, a first signal processing circuit 151, a second signal processing circuit 152, a third signal processing circuit 153, a memory control circuit 154, a CCD buffer M1, a display buffer M2, a central processing unit (CPU) 160, a film driving mechanism 170, an optical data reading unit 180, a magnetic record regeneration unit 182, and so forth.

The light source 130 is, for example, a fluorescent lamp which is extended in a direction perpendicular to the feed direction of the film 114. The light source 130 illuminates the film 114 through an infrared cutting filter 132. The image light, which has been transmitted through the film 114, is formed on a light-accepting surface of the CCD line sensor 142 through the taking lens 136, which is single-focus. Incidentally, while the CCD line sensor 142 is picking up the film image, the film 114 is moved in the direction of the arrow A (forward direction) or B (backward direction) by the film driving mechanism 170. A detailed explanation will be given later about the driving of the film.

The CCD line sensor 142 is arranged in a direction perpendicular to the film feed direction. The image light, which is formed on the light-accepting surface of the CCD line sensor 142, is charge-accumulated for a predetermined period of time in each sensor which has R, G or B filter. Then, the image light is converted into signal charge of R, G and B in accordance with the intensity of the light. The signal charge, which is accumulated as described above, is read to a shift register by a lead gate pulse of a predetermined cycle generated by a CCD driving circuit 144, and is sequentially read out by a register transfer pulse generated by the CCD driving circuit 144.

Incidentally, the CCD line sensor 142 has, for example, sensors of 1024 pixels in a direction perpendicular to the film feed direction (main-scanning direction). The number of pixels in the same direction as the film feed direction (sub-scanning direction) of one frame changes according to the film feed speed if the cycle of the lead gate pulse, etc. of the CCD driving circuit 144 does not change. In this embodiment, if the feed speed is ½, 1, 8, and 16 times as fast as the feeding speed when the standard film image is captured, the number of pixels is 1792, 896, 112, and 56, respectively.

The signal charge is read out from the CCD line sensor 142, and is cramped by a CDS cramp. Then, the cramped signal charge is sent to an analog processing circuit 146 as R, G and B signals. The gain, etc. of the R, G and B signals are controlled in the analog processing circuit 146. The R, G and B signals from the analog processing circuit 146 are made dot-sequential by a multiplexer 148, and are converted into digital signals by an A/D convertor 150. Then, the R, G and B signals are sent to the first signal processing circuit 151 and the CPU 160.

The first signal processing circuit 151 includes a white balance adjustment circuit, a negative-positive conversion circuit, a γ-correction circuit, a RGB simultaneous output circuit, and others. The first signal processing circuit 151 performs the signal processing of the dot-sequential R, G and B signals which are entered sequentially. Then, the circuit 151 sends R, G and B signals simultaneously to the second signal processing circuit 152. Incidentally, a detailed explanation will be given later about the white balance adjustment which is performed by the white balance adjustment circuit of the first signal processing circuit 151 according to a control signal received from the CPU 160.

The second signal processing circuit 152 has a matrix circuit, and generates a brightness signal Y and a chroma signal $C_{r/b}$ according to the sent R, G and B signals, and sends these signals to the memory control circuit 154. The memory control circuit 154 controls the write/read of the brightness signal Y and the chroma signal $C_{r/b}$ in and out of a CCD buffer M1. The memory control circuit 154 also controls the write/read of the brightness signal Y and the chroma signal $C_{r/b}$, which is stored in the CCD buffer M1, in and out of display buffer M2. Incidentally, a detailed explanation will be given later about the control of the write/read in and out of the CCD buffer M1 and the display buffer M2.

The brightness signal Y and the chroma signal $C_{r/b}$, which are read from the display buffer M2 by the memory control circuit 154, are sent to the third signal processing circuit 153. The third signal processing circuit 153 generates, for example, a color composite video signal of the NTSC system according to the brightness signal Y and the chroma signal $C_{r/b}$ and sends it to a mixer 155. Signals for displaying commands and icons used in the editing of each frame is also sent to the mixer 155. The mixer 155 mixes the video signal representing the film image, which are received from the third signal processing circuit 153, with the signals representing the commands and the icons. The mixed video signals are converted into analog signals by the D/A converter 156, and are output to the video output terminal 158. Incidentally, a synchronizing signal of a predetermined cycle is sent to the memory control circuit 154, the third signal processing circuit 153, the mixer 155, the D/A converter 156, and an on-screen display 157 by a synchronizing signal generating circuit 159. As a result, the circuits are synchronized, and a video signal including a desired synchronizing signal can be gained. Moreover, a timing signal is sent to the CCD circuit unit 140, the A/D converter 150, the first signal processing circuit 151, the second signal processing circuit 152, and the memory control circuit 154 by a timing signal generating circuit 162, which is controlled by the CPU 160. As a result, the circuits are synchronized.

The film driving mechanism 170 is engaged with the spool 112 of the film cartridge 110. The film driving mechanism 170 comprises a film supply part for driving the spool forward and backward, a film windup part for winding up the film 114 fed from the film supply part, and a means arranged on a film feed path for feeding the film 114 at a constant speed by a capstan and a pinch roller which hold the film 114. Incidentally, the film supply part drives the spool 112 of the film cartridge 110 clockwise in FIG. 4, and feeds the film 114 from the film cartridge 110 until the forward end of the film is wound up by the film windup part.

The optical data reading unit 180 includes a first optical sensor 180A for optically detecting the perforation 114A on the film 114, and a second optical sensor 180B for optically detecting the optical data such as a bar code recorded in the margin of the film 114. The optical data reading unit 180 processes the optical data, which is detected by the optical sensors 180A and 180B, and sends them to the CPU 160.

The magnetic record regeneration unit 182 includes a magnetic head 182A, and reads the magnetic data recorded in the magnetic record layer 114B of the film 114 by the magnetic head 182A. Then, the magnetic record regeneration unit 182 processes the magnetic data and sends it to the CPU 160. The sent data is stored in a random access memory (RAM) 160A built in the CPU 160. Reversely, the data, which is stored in the RAM of the CPU 160 is read to the magnetic record regeneration unit 182. The magnetic record regeneration unit 182 converts the data into a signal which is suitable for the magnetic recording. Then, the magnetic record regeneration unit 182 sends the signal to the magnetic head 182A, and records the data in the magnetic record layer 114B of the film 114.

Next, an explanation will be given about the operation of the film scanner 100, which is constructed in the above-mentioned manner with reference to a flow chart in FIG. 5.

When the film cartridge 110 is set in the film cartridge tray 102, the CPU 160 controls the film driving mechanism 170 to load the film (step 200). That is, the film 114 is sent out from the film cartridge 110, and the tip of the film 114 is wound on a windup axis of the film windup part.

Figure 6:
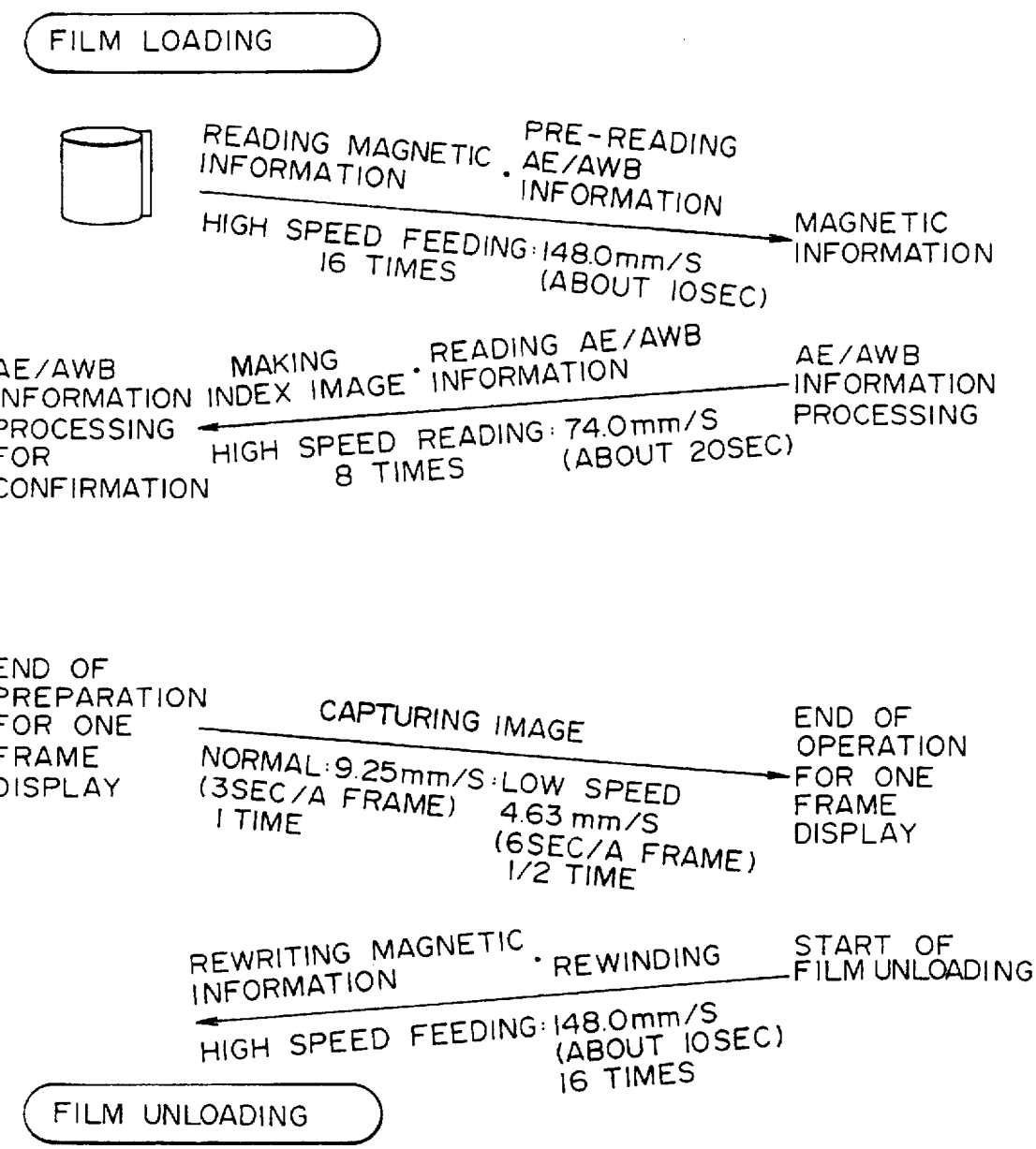
FIG. 6 is a view illustrating one example of a transport sequence of the film transported by the film scanner in FIG. 1.

When the film loading is completed, the first and second pre-scanning of the film 114 is executed (step 202). That is, in the case of the first prescanning, the film 114 feeds forward at a high speed of 148.0 mm/s as shown in FIG. 6, and the image data is captured by the CCD line sensor 142. The optical data and the magnetic data are read by the optical reading unit 180 and the magnetic record regeneration unit 182.

Next, an explanation will be given about the processing according to the image data, which is captured during the above-mentioned first pre-scanning.

The CPU 160 receives the dot-sequential R, G and B signals from the A/D converter 150 in FIG. 4. The CPU 160 receives the R, G and B signals of all frames separately, and calculates an offset quantity of each color signal and a gain adjustment quantity of each color signal for adjusting the white balance. Then, the CPU 160 stores the offset data representing the offset quantity of each color signal and the AWB data representing the gain adjustment quantity for each frame in the RAM 160A. The CPU 160 derives the AE data representing the brightness of each frame from the R, G, and B signals and stores the data in the RAM 160A. Incidentally, the CPU 160 is also able to detect a frame number by counting the perforations of each frame on the film 114.

Next, the second pre-scanning of the film 114 is executed. That is, in the case of the second pre-scanning, the film 114 is rewound backward at a high speed of 74.0 mm/s, and the image data is captured again by the CCD line sensor 142. When the image data is captured, the CPU 160 controls an aperture 134 of each frame according to the AE data, which is stored in the RAM 160A, by an aperture control unit 164. Incidentally, if the CCD line sensor 142 has an electronic shutter mechanism, the charge accumulation time in the CCD line sensor 142 is controlled by the CCD driving circuit 144, so that the exposure can be adjusted. In this case, the aperture 134 and the aperture control unit 164 are not required.

The CPU 160 makes the first signal processing circuit 151 adjust the -offset quantity and the white balance of the R, G and B signals of each frame. That is, the CPU 160 sends the offset data as to each color signal of each frame, which is stored in the RAM 160A, to the first signal processing circuit 151. The first signal processing circuit 151 adjusts the offset quantity of the dot-sequential R, G and B signals according to the offset data. Likewise, the CPU 160 sends the AWB data as to each color signal of each frame, which is stored in the RAM 160A, to the first signal processing circuit 151. The first signal processing circuit 151 adjusts the gain of the dot-sequential R, G and B signals according to the AWB data.

Because the image data of each frame is adjusted according to the AE/AWB data, etc. as described above, the satisfactory image data can be captured regardless of the photographic conditions of each frame.

Figure 7:
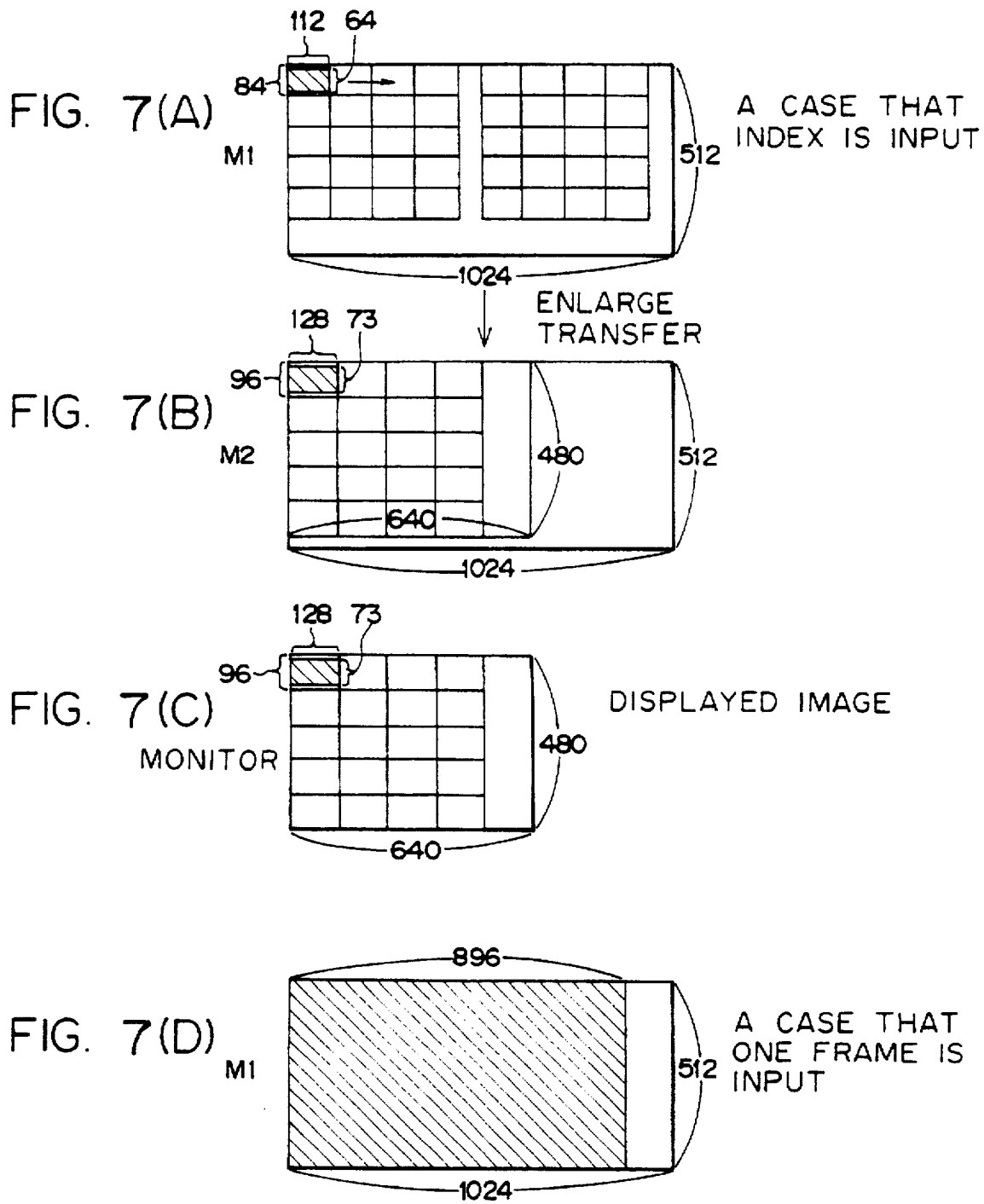
FIGS. 7 (A), 7 (B), 7 (C), and 7 (D) are views illustrating a CCD buffer in the film scanner in FIG. 1, a storage area in a display buffer, and a display screen of a monitor TV.

The image data of each frame, which has been adjusted as described above, that is, the brightness signal Y and the chroma signal $C_{rb}$ which are received from the second signal processing circuit 152 are sequentially stored in the CCD buffer M1 via the memory control circuit 154. Incidentally, as shown in FIG. 6 (A), the number of pixels in the same direction as the film feed direction of one frame is 112, because the film 114 feeds at a speed eight times as fast as the feeding speed when the standard film image is captured as mentioned previously. The CCD line sensor 142 has sensors of 1024 pixels in a direction perpendicular to the film feed direction as mentioned above. If the pixels are decreased to 1/16, the number of pixels in a direction perpendicular to the film feed direction of one frame is 64. The CCD buffer M1 has a storage capacity to store the data of 512×1024 pixels as shown in FIG. 7 (A). Therefore, the image data of 5×4×2 (=40) frames can be stored. That is, the image data representing the index image of 40 frames is stored in the CCD buffer M1.

The display buffer M2 has a storage capacity to store the data of 512×1024 pixels as shown in FIG. 7 (B). When the display buffer M2 stores the image data representing the index image, the pixels of one frame are increased to 73×128, and the image data of 5×4 (=20) frames is stored. When the index image is displayed on the monitor TV 109, 480×640 pixels of the upper left area of the display buffer M2 is read out (see FIGS. 7(B) and 7(C)).

The image data of each frame is stored in the CCD buffer M1 sequentially from the upper left storage area to the right as shown in FIG. 7(A) in the order in which the image data is read out during the above-mentioned scanning. If the image data of four frames has been stored, the image data is stored sequentially from the storage area one line below to the right. Then, if the image data of 5 lines (4×5=20 frames) is stored, the image data is stored in the storage area of next 20 frames in the same manner.

While the image data is being stored in the CCD buffer M1, what is stored in the CCD buffer M1 is sent to the display buffer M2.

The image data of only 20 frames can be stored in the display buffer M2 at one time. When the image data of the 21st frame is sent to the CCD buffer M1, the image data which is stored in the display buffer M2 is updated so that the index image can be scrolled upward. For example, if the image data of the 21st frame is sent to the CCD buffer M1, the image data of the one-line storage area from the frame No. 1 to No. 4 of the display buffer M2 is deleted, and the image data of the 21st frame is stored in the display buffer M2. The scanning start address when the video signal is sent is changed to the second line. As a result, the index image displayed on the monitor display TV 109 is scrolled upward by one line. When the image data of all frames is stored in the CCD buffer M1 in the above-mentioned manner, the screen is scrolled downward or switched so that the index image of frame numbers 1 through 20 can be displayed on the monitor TV 109.

Figure 8:
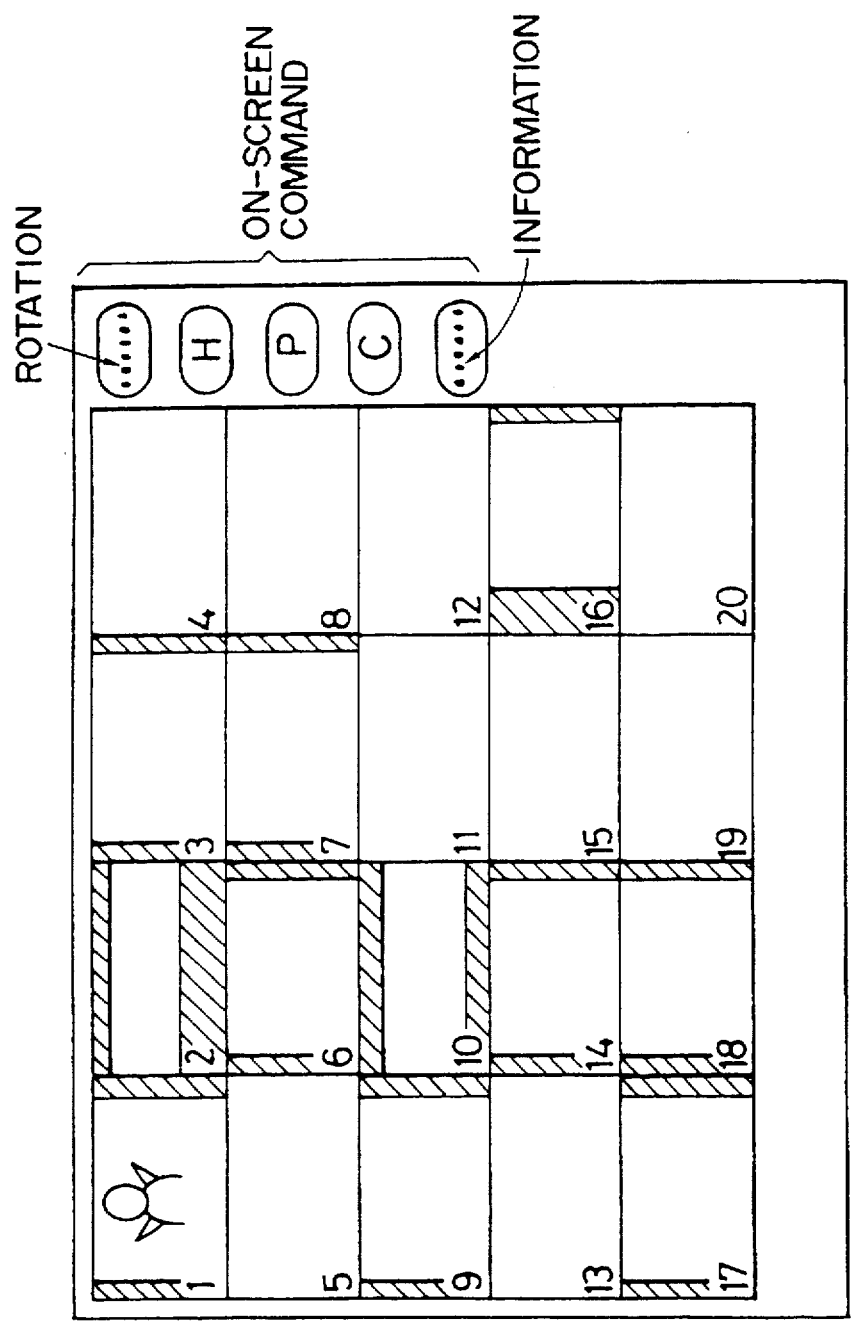
FIG. 8 is a view showing the setting, the changing, etc. of the aspect ratio by means of an index image.

The CPU 160 sends a character signal representing a frame number of each frame via the on-screen display 157 so that the index image, on which the frame numbers are superimposed, can be displayed as shown in FIG. 8. The frame numbers 1, 2 . . . are designated to the frames in an order in which the image data is captured during the above-mentioned scanning.

When the index image is displayed, the masked parts (indicated by slashes in FIG. 8) are displayed according to the optical or magnetic data including the format data of each frame, which is read during the first pre-scanning as mentioned above. As a result, the aspect ratio of each frame can be seen. In order to display the masked parts, the masked parts are painted over, the marked parts are displayed in half-tone so that the image in the masked parts can be seen, or the image parts according to the format data are displayed in color and the masked parts are displayed in black and white.

After the index image is made and displayed on the monitor TV 109, it is determined by the key operation, etc. whether the automatic regeneration is selected or not (step 203). If the automatic regeneration is not selected, a key pad 120 is used while the index image is being watched. Various types of information required for regenerating a desired film image on the monitor TV 109, and the information as to the print order are entered (step 204).

Various types of information as to the automatic regeneration and the print order can be entered in a method of on-screen interaction by the key pad 120 in FIG. 1.

That is, as shown in FIG. 1, the key pad 120 is composed of upper, lower, right and left keys 121, 122, 123, and 124, an "UP" key 125, a "DOWN" key 126, an "Execute" key 127, and a "Cancel" key 128.

The CPU 160 displays the characters, which represent each command on the monitor TV 109 via the on-screen display 157, together with the index image of 20 frames as shown in FIG. 8. Incidentally, "Rotation" is a command for standing the regeneration screen on the monitor. "H", "P", and "C" are each a command for the aspect ratio (H size, P size, and C size) of the film image, respectively. "Information" is a command for turning the screen for the further detailed editing of a frame to be edited.

In order to select the command, the "UP" and "DOWN" keys 125 and 126 of the key pad 120 are operated to move a cursor (which is distinguished from the other commands by its different color) to a position of the desired command, and the "Execute" key 127 is pressed. Incidentally, if the command is selected, the first frame is a frame to be edited, and the frame number of the first frame is currently displayed (the frame number is blinked). The upper, lower, right and left keys 121, 122, 123, and 124 of the key pad 120 are operated in order to select the frame to be edited.

In FIG. 8, when the first frame, which is displayed in the C size, is a frame to be edited, the cursor is set to "H", and the "Execute" key 127 is pressed. As a result, the format data, which represents the C size and is stored in the RAM 160A, is renewed to represent the H size. The masked parts at the right-hand side and the left-hand side of the frame in the index image are unmasked. Likewise, the cursor is set to "P", and the "Execute" key 127 is pressed, the format data, which represents the C size and is stored in the RAM 160A, is renewed to represent the P size. On the index screen, the masked parts at the right-hand side and the left-hand side of the frame are unmasked and the upper part and the lower part of the frame are unmasked. In this way, the aspect ratio can be changed to be different from the aspect ratio which is set during the photographing.

If a frame, which is displayed in the P size, is to be edited, for example, the upper and lower keys 121 and 122 are operated so that the ratio of the size between the upper masked part and the lower masked part of the frame is changed as shown in the second frame in FIG. 8. As a result, the frame image of the P size, which has been shifted vertically, can be displayed. If the "Execute" key 127 is pressed, the data representing the central position of the frame is stored in the RAM 160A. Likewise, when a frame, which is displayed in the L size, is to be edited, for example, the left and right keys 123 and 124 are operated so that the ratio of the size between the right masked part and the left masked part is changed as shown in the sixteenth frame in FIG. 8. As a result, the frame image of the L size, which has been shifted horizontally, can be displayed. If the "Execute" key 127 is pressed, the data representing the central position of the frame is stored in the RAM 160A. Moreover, if the key pad 120 is used, the information as to the length and breadth of the frame image, and so forth.

Figure 9:
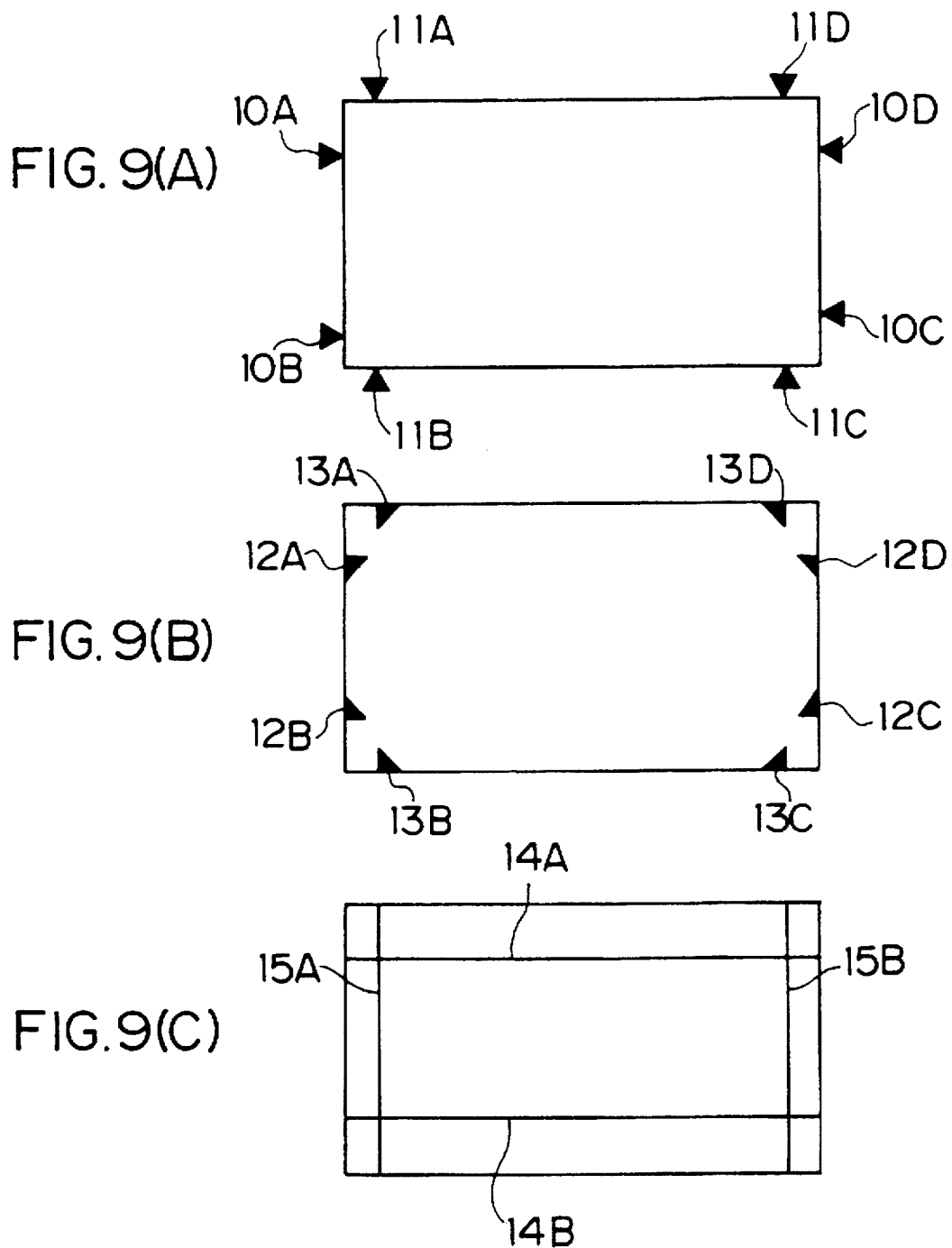
FIGS. 9 (A), 9 (B), and 9 (C) are views illustrating the other examples in which the aspect ratio of each frame of the index image are displayed in such a manner as to be seen.

Incidentally, in the embodiment as shown in FIG. 8, the unnecessary area in accordance with the aspect ratio is masked so that the aspect ratio of each frame in the index image can be seen. However, the present invention is not limited to this. As shown in FIG. 9, for example, the area of validity in accordance with the aspect ratio of each frame may be designated by marks 10A, 10B, 10C, 10D, 11A, 11B, 11C, and 11D (see FIG. 9 (A)), or marks 12A, 12B, 12C, 12D, 13A, 13B, 13C, and 13D (see FIG. 9 (B)), or edging lines 14A, 14B, 15A, and 15B (see FIG. 9 (C).)

When the editing by the index image is completed as described above, it is determined in step 206 (FIG. 5) whether or not each frame is edited. This is determined by means of the key pad 120 while the monitor TV 109 is being watched.

Next, an explanation will be given about the case when each frame is edited.

In this case, a number of a displayed frame is set to 1 (step 208), and then the film 114 feeds one frame forward at a speed of 9.25 mm/s as shown in FIG. 6. As a result, the frame of the frame number 1 is scanned (main-scanning) (step 210). During the main-scanning, the image data is captured by the CCD line sensor 142 and stored in the CCD buffer M2.

When the image data is captured, the image data of each frame is adjusted by CPU 160 according to the AE data, the AWB data, etc. stored in the RAM 160A. Therefore, the satisfactory image data can be stored in the CCD buffer M1 regardless of the photographing conditions of each frame. The number of pixels in one frame, which are stored in the CCD buffer M1 as described above, is 512×896 as shown in FIG. 7 (D). That is, the CCD output of the CCD line sensor 142, which has sensors of 1024 pixels, is decreased to ½ during the main-scanning, so that the number of pixels in a direction perpendicular to the film feed direction of one frame is 512. The film feed speed is lowered to ⅛ of the feed speed when the image data of the index image is captured. As a result, the number of pixels in the same direction as the film feed direction of one frame is 896, which is eight times as many as the number of pixels (112) in the same direction as the film feed direction of one frame in the index image.

Figure 10:
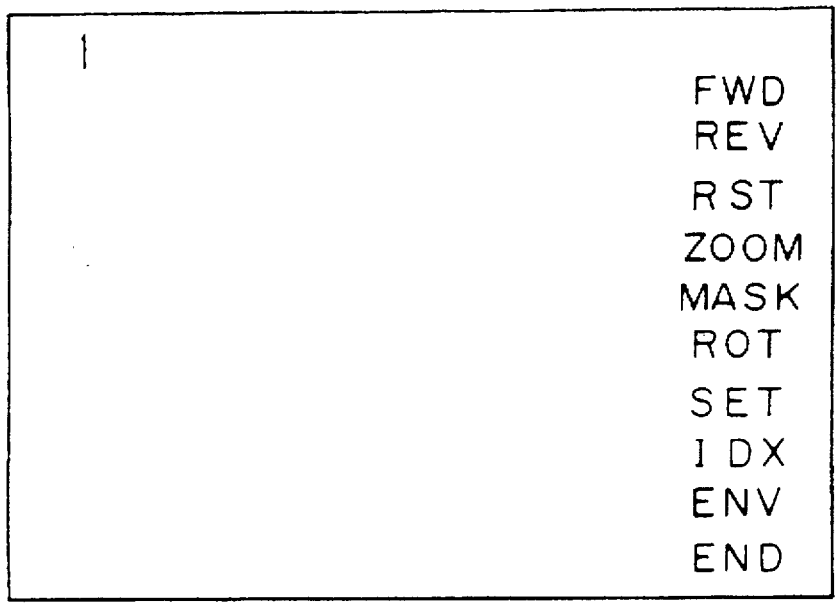
FIG. 10 is a view illustrating an example of a monitor screen in a one-frame regeneration menu setting mode.

The image data of one frame, which is stored in the CCD buffer M1 as described above, is sent to the display buffer M2. Then, what is stored in the display buffer M2 is read out repeatedly, so that the image of one frame can be displayed on the monitor TV 109. Incidentally, during the mode for setting the one-frame regeneration menu, a frame number is displayed at the upper left-hand side on the screen of the monitor TV 109 as shown in FIG. 10. Characters are displayed at the right-hand side on the screen of the monitor TV 109 so as to represent a setting menu required for the editing of one frame, and the like. Incidentally, "FWD" represents the regeneration of the next frame; "REV" represents the regeneration of the previous frame; "RST" represents the resetting of each setting for re-scanning; "ZOOM" represents the setting of zooming; "MASK" represents the setting of masking; "ROT" represents the setting of the length and breadth of the frame; "SET" represents the setting of the number of prints, etc.; "IDX" represents the display of the index image; "ENV" represents the setting of the environment such as an interval time, a background color, etc.; and "END" represents the end of the editing carried out by means of the image in one frame.

In order to select the menu, the "UP" and "down" keys 125 and 126 of the key pad 120 are operated to move the cursor to a position of a desired menu, and the "Execute" key 127 is press in the same manner as when the index image is used for the editing as described above.

When the cursor is set to the "ZOOM", and the "Execute" key 127 is pressed, the zoom setting menu is designated (step 212). In the zoom setting menu, the upper, lower, right and left keys 121, 122, 123 and 124 of the key pad 120 are operated to move the pointer appropriately, and the center of zooming is instructed. Then, the "UP" key 125 or the "DOWN" key 126 are pressed in order to perform the zooming-up or the zooming-out by electronic zooming. After the desired zooming, the "Execute" key 127 is pressed to decide the setting of zooming, which is stored in the RAM 160A of the CPU 160 (step 214).

In the above-described electronic zooming, the zooming can be performed in a range of, for example, 0.5–1.5. If the magnification of the electronic zooming is 1.5, and the zooming-up is instructed by the "UP" key 125, the main-scanning is performed at a low speed. In this case, the film 114 feeds forward at a speed of 4.63 mm/s (½ of the speed in the normal main-scanning). The CCD output of the CCD line sensor 142 is not decreased, and is stored in a state that the designated zoom center is a reference. As a result, the image data, which is zoomed twice as large as the image data in the normal main-scanning, is stored. The electronic zooming of the image data is performed so that the image data can be zoomed three times at the maximum.

Furthermore, it is possible to enter a title which is superimposed on the frame image, by use of the key pad 120 (steps 218 and 220). The character data representing the title is stored in the RAM 160A of the CPU 160. When the cursor is set to "MASK", and the "Execute" key 127 is pressed, the framing setting menu can be selected. The key pad 120 is used to enter the size and the position of a frame, which is provided around the frame image (steps 224 and 226).

After the display frame is edited as explained above, the cursor is set to "END", and the "Execute" key 127 is pressed, so that the editing of the display frame is completed (step 234). On the other hand, the cursor is set to "FWD" or "REV", and the "Execute" key 127 is pressed, the frame number is increased or decreased by 1 (step 236), and the process returns to step 210. As a result, other display frames can be edited in the above-described manner.

When the editing of the display frame is completed (step 234), the film 114 feeds backward at a high speed of 148.0 mm/s as shown in FIG. 6.

During the feeding, the magnetic data, which is read previously from the magnetic record layer 114 B of the film 114 and is stored in the RAM 160A of the CPU 160, the data relating the editing by use of the index image, the data relating to the editing by use of the display frame, and the like are recorded again in the magnetic record layer 114B of the film 114 (step 238). After the rewinding, the film cartridge 110 is taken out (step 240).

On the other hand, if the editing is not performed by use of the display frame in step 206, the process goes on to steps 242 and 244. The recording in the magnetic record layer 114B of the film 114 is performed, and the film cartridge 110 is taken out just as in the steps 238 and 240.

Figure 5:
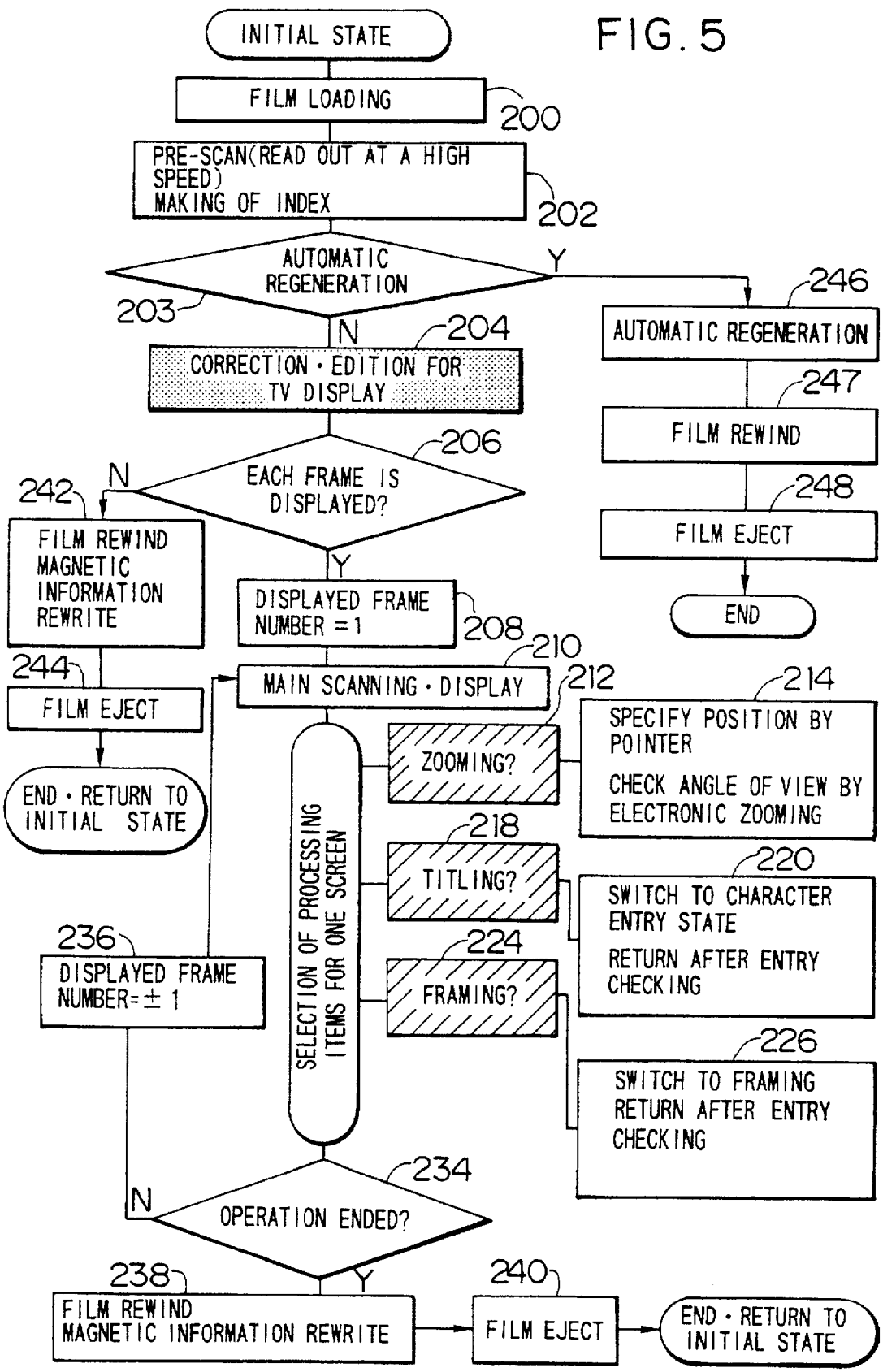
FIG. 5 is a flow chart showing an operation of the film scanner in FIG. 1.

After the entry of the automatic regeneration information for regenerating a plurality of film images in one roll of the film sequentially and automatically, and the selection of the automatic regeneration in the step 203 in FIG. 5, a plurality of film images in one roll of film are regenerated sequentially and automatically according to the automatic regeneration information (step 246). When the film is rewound after the automatic regeneration is over, the magnetic information such as the automatic regeneration information, etc. is recorded again in the magnetic record layer 114B of the film 114 (step 247). After the rewinding, the film cartridge 110 is taken out (step 248). Once the automatic regeneration information is recorded in the magnetic record layer of the film, the automatic regeneration can be performed in accordance with the automatic regeneration information by reading the automatic regeneration information in the pre-scanning. Incidentally, if the optical data or the magnetic data are different from each other with regard to the same automatic regeneration information or print order information, the magnetic data is used.

Next, an explanation will be given about the other embodiment of the film image input method according to the present invention.

The film scanner is united with a printer, and is able to be scanned at a higher resolution than that of the printer. For example, the number of pixels in the film image, which is printed by the printer, is 1024×1792, and the number of pixels in the CCD line sensor is 2048. If the cycle of the lead gate pulse, etc. of the CCD driving circuit does not change, the number of pixels in the same direction as the film feed direction of one frame changes according to the film feed speed. A maximum of 4,000 pixels can be captured. However, the number of pixels in the image memory is 1024×2048 so as to minimize its capacity. The reason why the film scanner's resolution is high is that the main scanning is performed at a low speed and the image data, which is zoomed twice as large as the data in the case when the normal main scanning is performed, is captured, if the magnification of the electronic zooming is 1.5 and the zooming-up is instructed again.

The aspect ratio of each frame can be detected before the main scanning. Therefore, when the main scanning is performed, the scanning area in the main-scanning direction by the CCD line sensor is changed according to the aspect ratio of the frame to be scanned. That is, if the frame to be scanned is a size H or L, a capturing area covers the whole width of the CCD line sensor. The image data, which is obtained from the capturing area is decreased to ½ and is stored in the image memory. On the other hand, if the frame to be scanned is a size P, the capturing area covers the width of the CCD line sensor, which corresponds to the P size. The electronic zoom processing such as the decrease and interpolation is performed so that the number of pixels in the image data obtained from the above-mentioned capturing area can be 1024, and the processed image data is stored in the image memory. For example, if the number of pixels in the capturing area of the CCD line sensor corresponding to the P size is more than 1024, the image data is decreased so that the number of pixels in the image data obtained from the capturing area can be 1024. If the number of pixels in the capturing area of the CCD line sensor corresponding to the P size is less than 1024, the image data is interpolated so that the number of pixels in the image data obtained from the capturing area can be 1024.

In the case when the aspect ratio is already known as mentioned above, the capturing capacity of the film scanner can be used to the full. The resolution in the main-scanning direction of the film image printed by the printer can be the same if the frame to be scanned is in the sizes H, L and P.

In the above-described embodiment, the number of pixels in the main-scanning direction of the CCD line sensor is fixed regardless of the aspect ratio of an objective frame by the decrease and interpolation of the image data obtained by the CCD line sensor. However, the present invention is not limited to this. If the zoom lens is used as the taking lens 136 in FIG. 4, and the magnification of the zoom lens is changed according to the aspect ratio of each frame (for example, the magnification is changed so that an image area of P size is formed over the whole width of the CCD line sensor), the resolution of the film scanner can be used effectively as mentioned above. However, when the image data of P size, which has shifted in the vertical direction as shown in the second frame in FIG. 8 is captured, the film, the zoom lens, or the image pickup means including the image pickup element has to be moved in the vertical direction.

Figure 11:
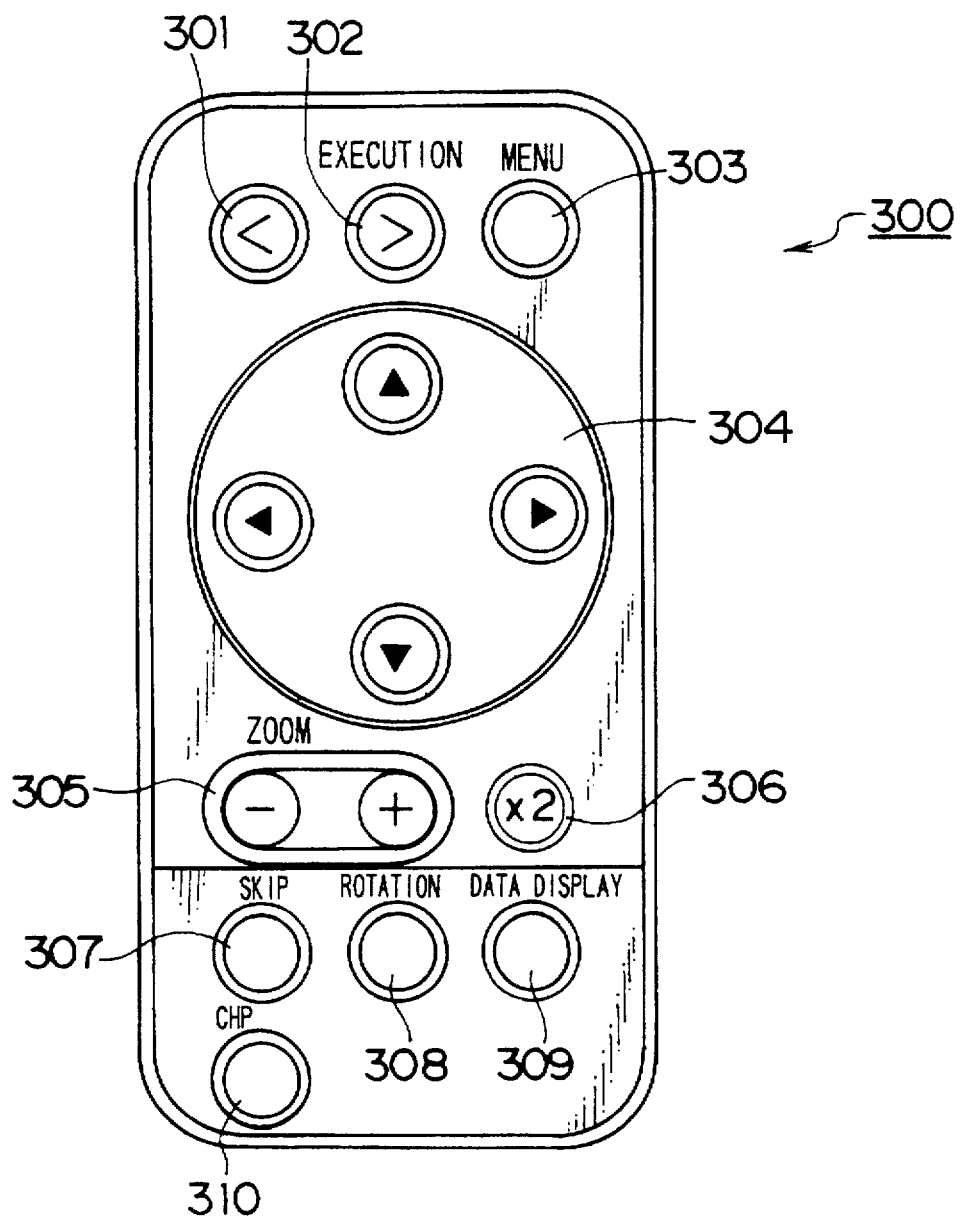
FIG. 11 is a plan view illustrating a remote controller which is applied to the film scanner in FIG. 1.

FIG. 11 is a plane view illustrating a remote controller 300 applied to the film scanner 100. The remote controller 300 is used in place of the key pad 120 in FIG. 1. It transmits an infrared remote control signal to the film scanner 100 according to the key operations.

Figure 12:
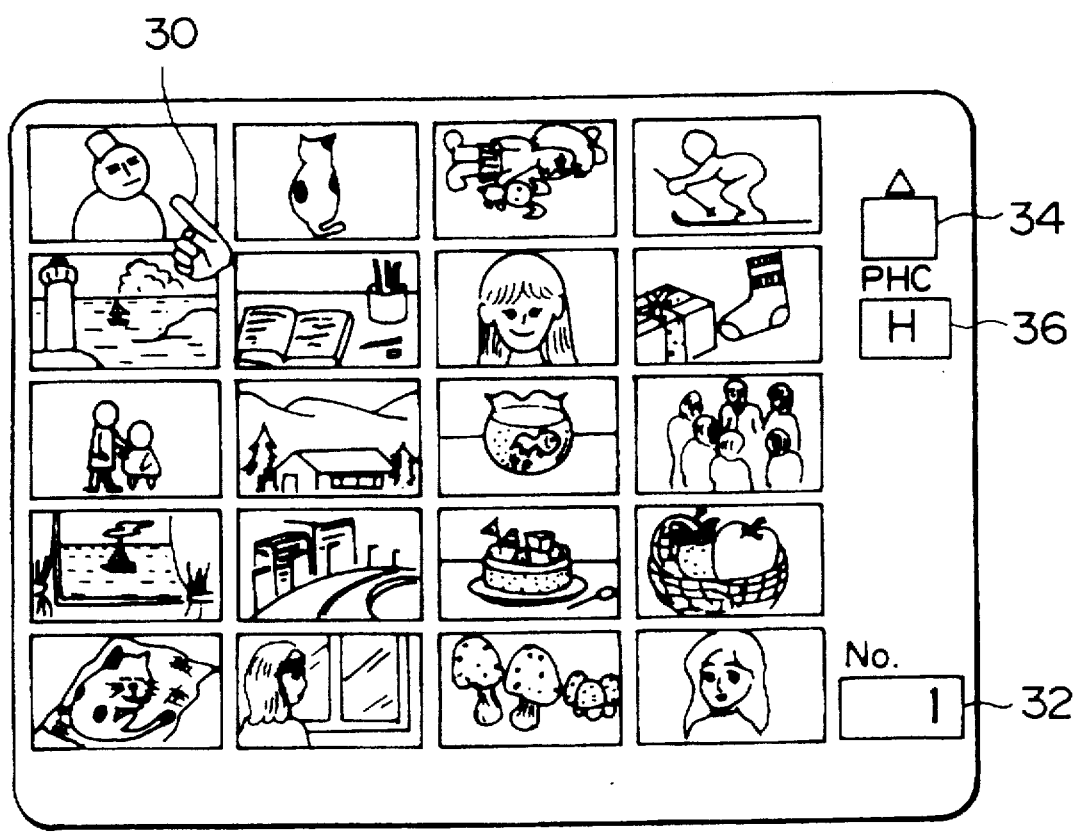
FIG. 12 is a view illustrating another embodiment of a monitor screen on which the index image is displayed.

FIG. 12 shows the other embodiment of the monitor screen, on which the index image is displayed. As shown in the figure, 20 frames of the index image are displayed on the monitor screen, and an image selection mark 30, a frame number 32, an upward direction mark 34 indicating a lengthwise direction of the frame, and format information 36 as to one of C, H and P print formats. Incidentally, the image selection mark 30 can be moved up and down, right and left by the operation of a "Select" key 304 of the remote controller 300. The frame number 32, the upward direction mark 34, and the format information 36 of a frame which is selected by the image selection mark 30. If a "Reverse" key 301 or an "Execution/Play" key 302 is pressed, the backward regeneration or the forward regeneration in a designated regeneration mode is started from the frame selected by the image selection mark 30.

Figure 13A:
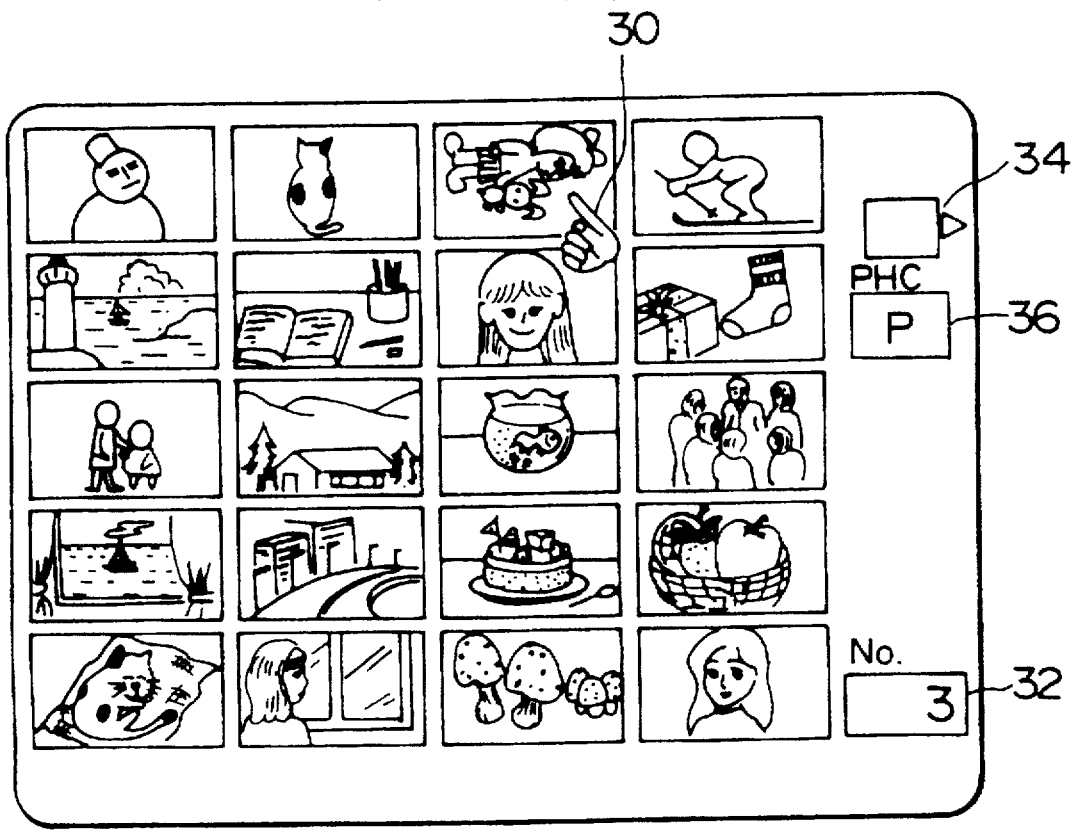
FIGS. 13 (A) and 13 (B) are views showing the setting of the vertical direction of each frame and the setting of the aspect ratio by means of the index image.
Figure 13B:
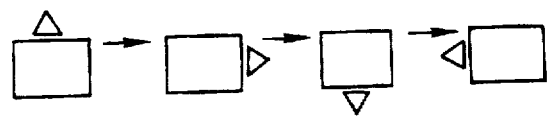

Next, an explanation will be given about the case when the upward direction of each frame is designated on the index screen. In this case, the image selection mark 30 is moved to a frame, of which the upward direction is designated (the third frame in FIG. 13 (A)), as shown in FIG. 13 (A) while the "Select" key 304 is being pressed. Then, a "Rotation" key 308 of the remote controller 300 is pressed to designate the upward direction of the frame. Incidentally, every time the "Rotation" key 308 is pressed, the upward direction mark 34 rotates clockwise by 90° as shown in FIG. 13 (B). The rotational position designates the upward direction of the frame.

Figure 14:
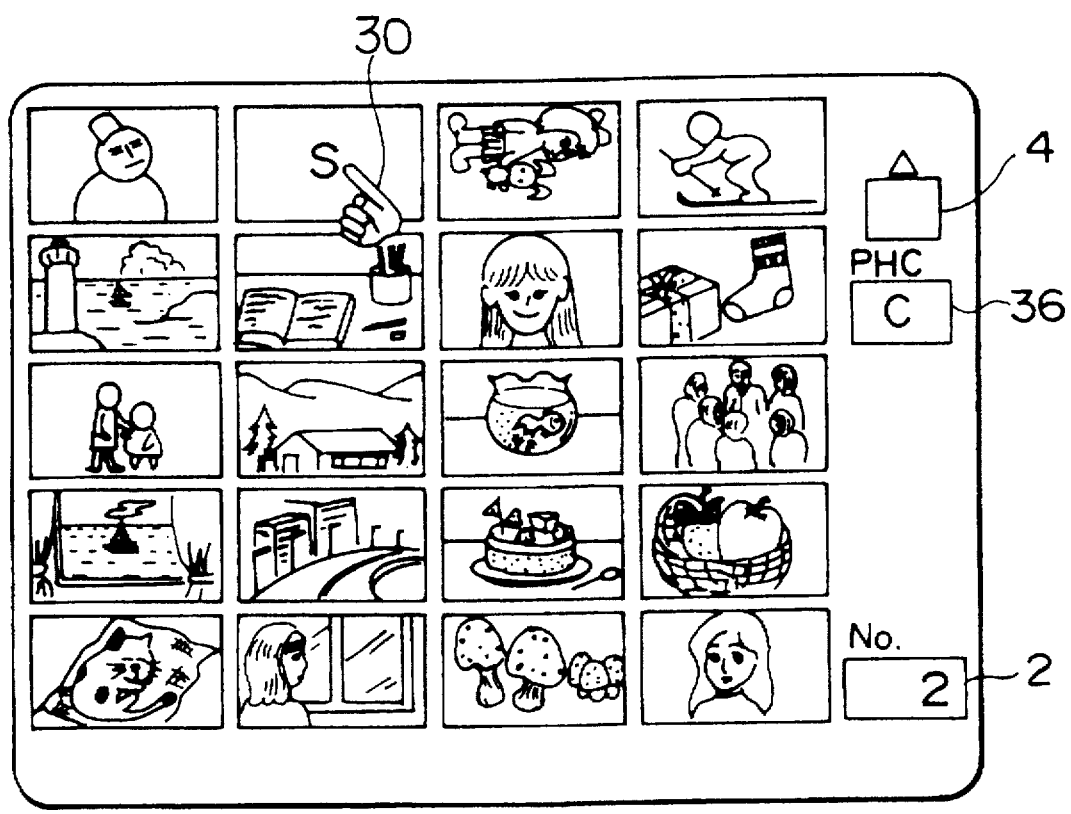
FIG. 14 is a view showing the skip setting by means of the index image.

When the print format is changed, the image selection mark 30 is moved to a frame, of which the print format is changed, while the "Select" key 304 is being pressed. Then, a "CHP" key 310 of the remote controller 300 is pressed, so that the desired format information 36 is displayed. Furthermore, when a frame, which is not displayed in the regeneration mode, is designated, the image selection mark 30 is moved to a frame, which is designated as a non-display frame (the second frame in FIG. 14), as shown in FIG. 14 while the "Select" key 304 is pressed. Then, a "Skip" key 307 of the remote controller 300 is pressed. As a result, the non-display frame is deleted from the index image, and an "S" mark representing "Skip" is displayed.

Incidentally, a "Menu" key 303 is pressed while the index image is displayed, an index menu is displayed on the monitor screen, so that various types of menus such as designation of the number of prints can be selected. If the "Reverse" key 301 or the "Execution/Play" key 302 is pressed while each frame is generated sequentially, the regeneration stops, and one screen is regenerated. If a "Data Display" key 309 of the remote controller 300 is pressed while one screen is regenerated, the display/non-display of the frame data is switched. Moreover, while one screen is regenerated, the panning/tilting, the rotation, the manual zooming, and the ×2 magnification display of the display screen can be performed. That is, if ←→ keys of the "Select" key 304 are pressed when one screen is regenerated, the screen is panned (in the horizontal direction). If a ↑↓ keys are pressed, the screen is tilted (in the vertical direction). If the "ZOOM" key 305 is pressed, the image can be zoomed up and down. Furthermore, if a "×2" key 306 of the remote controller 300 is pressed, the display image can be magnified twice to be displayed. That is, if the "×2" key 306 is pressed after the displayed area is moved by the "Select" key 304 and the "Zoom" key 305, the image is scanned again at a resolution which is twice the normal one, with the displayed area being a reference.

As has been described above, according to the film image input method of the present invention, when the index image is displayed, the aspect ratio of each frame can be displayed so as to be seen in accordance with the format information as to the aspect ratio, which is recorded on the film optically and/or magnetically. If the format information of the frame, which is selected from the index image, is changed, the aspect ratio of each frame is displayed so as to be seen in accordance with the changed format information. Therefore, the aspect ratio of each frame can be changed easily according to the user's preference. Moreover, when the aspect ratio of a smaller area than a predetermined exposure area, which is exposed regardless of the aspect ratio, is designated or changed, the displayed or printed area can be moved and displayed in the exposure area.

Furthermore, according to the present invention, when the area of validity according to the aspect ratio of the scanned film image is captured, the area is zoomed electronically or optically so that the number of pixels in the main-scanning direction of the area can be fixed. As a result, the resolution of the film scanner can be used effectively, and the resolution can be prevented from being lowered when the image is displayed on the monitor or printed.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A film image input method, comprising feeding a roll of developed photographic film, in which a subject image is taken into a predetermined exposure area regardless of an aspect ratio of a film image, and format information as to said aspect ratio is recorded optically and/or magnetically on said film in accordance with each frame, to an image capturing part so as to capture image data of plural frames by said image capturing part, making an index image composed of plural frames in accordance with captured image data of plural frames, and displaying said index image on display means, said film image input method comprising the steps of:

optically and/or magnetically reading said format information recorded on said film;

executing an image processing according to said format information of each frame when said index image is displayed; and making it possible for the aspect ratio of each frame in said index image to be seen.

2. The film image input method according to claim 1, further comprising the step of executing an image processing according to the changed format information if the format information of a frame selected from said index image is changed.

3. The film image input method according to claim 2, wherein said format information of each frame is magnetically recorded on said film of said frame.

4. The film image input method according to claim 1, wherein said image processing conforming to said format information is executed in such a manner that a mask covers an unnecessary area caused by the aspect ratio of each frame in accordance with said format information.

5. The film image input method according to claim 2, wherein said image processing conforming to said format information is executed in such a manner that a mask covers an unnecessary area caused by the aspect ratio of each frame in accordance with said format information.

6. The film image input method according to claim 4, wherein said mask is displayed in one method in which said unnecessary area is painted over, a method in which said unnecessary area is displayed in half-tone, and a method in which an area of validity according to said format information is displayed in color and said unnecessary area is displayed in black and white.

7. The film image input method according to claim 5, wherein said mask is displayed in one method in which said unnecessary area is painted over, a method in which said unnecessary area is displayed in half-tone, and a method in which an area of validity according to said format information is displayed in color and said unnecessary area is displayed in black and white.

8. The film image input method according to claim 4, wherein said mask covers upper and lower or right and left areas of an image in said predetermined exposure area, and when an instruction is entered to move an area of validity other than said mask up and down or right and left, a ratio of sizes of the upper and lower or right and left areas of said mask is changed conforming to said instruction, so that said area of validity is moved up and down or right and left.

9. The film image input method according to claim 5, wherein said mask covers upper and lower or right and left areas of an image in said predetermined exposure area, and when an instruction is entered to move an area of validity other than said mask up and down or right and left, a ratio of sizes of the upper and lower or right and left areas of said mask is changed conforming to said instruction, so that said area of validity is moved up and down or right and left.

10. The film image input method according to claim 1, wherein said image processing conforming to said format information is executed in such a manner that only an image in an area of validity according to the aspect ratio of each frame in accordance with said format information.

11. The film image input method according to claim 2, wherein said image processing conforming to said format information is executed in such a manner that only an image in an area of validity according to the aspect ratio of each frame in accordance with said format information.

12. The film image input method according to claim 1, wherein said image processing conforming to said format information is executed in such a manner that an index is added for designating an area of validity according to the aspect ratio of each frame in accordance with said format information.

13. The film image input method according to claim 2, wherein said image processing conforming to said format information is executed in such a manner that an index is added for designating an area of validity according to the aspect ratio of each frame in accordance with said format information.

14. The film image input method according to claim 1, wherein said image processing conforming to said format information is executed in such a manner that said format information is displayed in a command area on said display means in accordance with format information of a frame selected from said index image among said format information.

15. The film image input method according to claim 2, wherein said image processing conforming to said format information is executed in such a manner that said format information is displayed in a command area on said display means in accordance with format information of a frame selected from said index image among said format information.

16. The film image input method according to claim 1, wherein a ratio of sizes of upper and lower or right and left unnecessary areas in said area of validity is changed conforming to an instruction for moving said area of validity according to format information of a frame selected from said index image, so that said area of validity is moved up and down or right and left.

17. The film image input method according to claim 2, wherein a ratio of sizes of upper and lower or right and left unnecessary areas in said area of validity is changed conforming to an instruction for moving said area of validity according to format information of a frame selected from said index image, so that said area of validity is moved up and down or right and left.

18. A film image input method comprising feeding a roll of developed photographic film, in which film image and format information as to an aspect ratio of said film image are optically and/or magnetically recorded on said film in accordance with each frame, to an image capturing part including a line sensor so as to capture said film image by said image capturing part, said film image input method comprising the steps of:

reading said format information as to the aspect ratio of each frame optically and/or magnetically; and capturing an area of validity in accordance with said format information of said film image by electronically or optically zooming said area of validity according to said format information so that the number of pixels in a main-scanning direction of said area of validity is predetermined.

19. The film image input method according to claim 18, wherein an electronic zoom processing is performed by decreasing and/or interpolating image data obtained from said line sensor conforming to said format information so that the number of pixels in said main-scanning direction of said area of validity is predetermined.

20. The film image input method according to claim 18, wherein a magnification of a taking lens for forming said film image on a light-accepting surface of said line sensor is variable, and the magnification of said taking lens is changed according to said format information so that the number of pixels in said main-scanning direction of said area of validity is predetermined.

* * * * *